(12) United States Patent
Ishimoto et al.

(10) Patent No.: US 11,569,519 B2
(45) Date of Patent: Jan. 31, 2023

(54) MEMBRANE ELECTRODE ASSEMBLY AND FUEL CELL

(71) Applicant: PANASONIC INTELLECTUAL PROPERTY MANAGEMENT CO., LTD., Osaka (JP)

(72) Inventors: Hitoshi Ishimoto, Hyogo (JP); Kazuya Yamasaki, Osaka (JP); Motohiro Sakata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 166 days.

(21) Appl. No.: 16/488,193

(22) PCT Filed: Feb. 9, 2018

(86) PCT No.: PCT/JP2018/004533
§ 371 (c)(1),
(2) Date: Aug. 22, 2019

(87) PCT Pub. No.: WO2018/155220
PCT Pub. Date: Aug. 30, 2018

(65) Prior Publication Data
US 2021/0143460 A1 May 13, 2021

(30) Foreign Application Priority Data
Feb. 23, 2017 (JP) .............................. JP2017-032600

(51) Int. Cl.
*H01M 8/1004* (2016.01)
*H01M 4/86* (2006.01)
*H01M 4/02* (2006.01)

(52) U.S. Cl.
CPC ....... *H01M 8/1004* (2013.01); *H01M 4/8657* (2013.01); *H01M 4/8605* (2013.01);
(Continued)

(58) Field of Classification Search
None
See application file for complete search history.

(56) References Cited

U.S. PATENT DOCUMENTS

| 2003/0059667 A1* | 3/2003 | Hori | H01M 4/96 502/101 |
|---|---|---|---|
| 2003/0072991 A1 | 4/2003 | Matsubara et al. | |

(Continued)

FOREIGN PATENT DOCUMENTS

| CN | 102082275 A | 6/2011 |
|---|---|---|
| JP | H06-196171 A | 7/1994 |

(Continued)

OTHER PUBLICATIONS

Machine translation of WO2015141595A1 from Espacenet originally published on Sep. 2015 to Sasaki (Year: 2015).*

(Continued)

*Primary Examiner* — Ula C Ruddock
*Assistant Examiner* — Mary Grace Byram
(74) *Attorney, Agent, or Firm* — McDermott Will & Emery LLP (57) ABSTRACT

A membrane electrode assembly includes an electrolyte membrane, and a pair of electrode layers which sandwich the electrolyte membrane. The pair of electrode layers include a pair of catalyst layers which sandwich the electrolyte membrane, and a pair of gas diffusion layers disposed on the pair of catalyst layers on opposite sides to the electrolyte membrane. At least one catalyst layer contains a fibrous electric conductor, catalyst particles, a particulate electric conductor, and a proton-conductive resin. The at least one catalyst layer has a first region at a distance of 200 nm or less from the fibrous electric conductor, and a second region at a distance of more than 200 nm from the fibrous electric conductor. Pores are present in the first and second regions. A mode diameter M1 of the pores in the first region (Continued)

and a mode diameter M2 of the pores in the second region satisfy M1<M2.

14 Claims, 4 Drawing Sheets

(52) U.S. Cl.
CPC ........ *H01M 2004/021* (2013.01); *Y02E 60/10* (2013.01); *Y02E 60/50* (2013.01)

(56) References Cited

U.S. PATENT DOCUMENTS

| | | | |
|---|---|---|---|
| 2003/0091891 A1 | 5/2003 | Yoshida et al. | |
| 2004/0115517 A1 | 6/2004 | Fukuda et al. | |
| 2005/0181270 A1* | 8/2005 | Sugiura | H01M 4/926 429/483 |
| 2006/0134506 A1 | 6/2006 | Kim et al. | |
| 2008/0213644 A1 | 9/2008 | Shindoh et al. | |
| 2009/0291345 A1* | 11/2009 | Hommura | H01M 4/881 29/623.5 |
| 2010/0015493 A1 | 1/2010 | Adachi et al. | |
| 2010/0159301 A1* | 6/2010 | Tanuma | H01M 4/92 502/159 |
| 2010/0159305 A1* | 6/2010 | Yan | H01M 4/926 429/523 |
| 2011/0008707 A1* | 1/2011 | Muraoka | H01M 8/1013 429/483 |
| 2011/0129759 A1 | 6/2011 | Hwang et al. | |
| 2013/0252132 A1* | 9/2013 | Mei | H01M 4/8871 216/13 |
| 2014/0302419 A1* | 10/2014 | Nanba | H01M 8/1053 429/482 |
| 2017/0365862 A1 | 12/2017 | Yamasaki et al. | |

FOREIGN PATENT DOCUMENTS

| | | | |
|---|---|---|---|
| JP | H06-203852 A | 7/1994 | |
| JP | H08-17440 A | 1/1996 | |
| JP | 2003-123769 A | 4/2003 | |
| JP | 2003-151564 A | 5/2003 | |
| JP | 2004-119398 A | 4/2004 | |
| JP | 2004-158388 A | 6/2004 | |
| JP | 2005-228601 A | 8/2005 | |
| JP | 2008-517426 A | 5/2008 | |
| JP | 2008-159426 A | 7/2008 | |
| JP | 2008-258060 A | 10/2008 | |
| WO | 2015/141595 A1 | 9/2015 | |
| WO | WO-2015141595 A1 * | 9/2015 | ......... H01M 4/8673 |
| WO | 2016/157746 A1 | 10/2016 | |

OTHER PUBLICATIONS

International Search Report and Written Opinion issued in International Patent Application No. PCT/JP2018/004533, dated May 15, 2018; with partial English translation.

Chinese Office Action issued in the corresponding Chinese Patent Application No. 201880013421.4, dated Nov. 3, 2021; with partial English translation.

* cited by examiner

MEMBRANE ELECTRODE ASSEMBLY AND FUEL CELL

CROSS-REFERENCE OF RELATED APPLICATIONS

This application is the U.S. National Phase under 35 U.S.C. § 371 of International Patent Application No. PCT/JP2018/004533, filed on Feb. 9, 2018, which in turn claims the benefit of Japanese Application No. 2017-032600, filed on Feb. 23, 2017, the entire disclosures of which Applications are incorporated by reference herein.

TECHNICAL FIELD

The present disclosure relates to a membrane electrode assembly (abbreviated as MEA) and a fuel cell including the same, specifically to an MEA including a catalyst layer containing a fibrous electric conductor.

BACKGROUND ART

Fuel cells are a highly efficient clean power generator, which generate power through electrochemical reaction of fuel and oxidant (hereinafter, each simply referred to as "gas"), to produce water. A fuel cell includes, for example, an electrolyte membrane, a pair of catalyst layers disposes so as to sandwich the electrolyte membrane, a pair of gas diffusion layers so as to sandwich the electrolyte membrane, with each of the catalyst layers interposed therebetween, and a pair of separators disposed on outer sides of the gas diffusion layers, so as to sandwich the electrolyte membrane. Gas supplied to the gas diffusion layer from the separator diffuses in the diffusion layer, and is oxidized or reduced in the catalyst layer. Increasing gas diffusion performance in the catalyst layer can improve the efficiency of the electrochemical reaction.

To increase gas diffusion performance in the catalyst layer, Patent Literature 1 teaches adding a plate-like carbon member to the catalyst layer, to form voids.

CITATION LIST

Patent Literature

[PTL 1] WO 2016/157746

SUMMARY OF INVENTION

Even though a plate-like or fibrous electric conductor is added to the catalyst layer, voids are formed randomly, causing gas pathways to be non-uniform. It is therefore difficult to allow gas to diffuse throughout the catalyst layer, making it difficult to allow the reaction to proceed efficiently.

One aspect of the present disclosure relates to a membrane electrode assembly. The membrane electrode assembly includes an electrolyte membrane, and a pair of electrode layers disposed so as to sandwich the electrolyte membrane. The pair of electrode layers include a pair of catalyst layers disposed so as to sandwich the electrolyte membrane, and a pair of gas diffusion layers disposed on the pair of catalyst layers on respective opposite sides to the electrolyte membrane. At least one catalyst layer of the pair of catalyst layers contains a fibrous electric conductor, catalyst particles, a particulate electric conductor, and a proton-conductive resin. The at least one catalyst layer has a first region at a distance of 200 nm or less from the fibrous electric conductor, and a second region at a distance of more than 200 nm from the fibrous electric conductor. Pores are present in the first region and the second region. A mode diameter M1 of the pores in the first region and a mode diameter M2 of the pores in the second region satisfy M1<M2.

Another aspect of the present disclosure relates to a fuel cell including the above membrane electrode assembly, and a pair of separators disposed so as to sandwich the membrane electrode assembly, with each of the pair of the gas diffusion layers interposed therebetween.

In the catalyst layer of the MEA of the present disclosure, gas diffusion performance as well as proton transport performance can be enhanced.

DESCRIPTION OF EMBODIMENTS (MEA)

An MEA according to one embodiment of the present disclosure includes an electrolyte membrane, and a pair of electrode layers disposed so as to sandwich the electrolyte membrane. The pair of electrode layers include a pair of catalyst layers disposed on the pair of catalyst layers on respective opposite sides to the electrolyte membrane. At least one catalyst layer of the pair of catalyst layers contains a fibrous electric conductor, catalyst particles, a particulate electric conductor, and a proton-conductive resin. The at least one catalyst layer has a first region at a distance of 200 nm or less from the fibrous conductor, and a second region at a distance of more than 200 nm from the fibrous conductor. Pores are present in the first region and the second region. A mode diameter M1 of the pores in the first region and a mode diameter M2 of the pores in the second region satisfy M1<M2.

Adding the fibrous conductor to the catalyst layer can prevent the particulate conductor from being packed densely, and thus can secure voids within the catalyst layer. However, voids are formed randomly. This causes gas pathways to be non-uniform, making it difficult to improve gas diffusion performance in the catalyst layer.

In the present embodiment, the catalyst layer is formed such that the mode diameter M1 of the pores in the first region at a distance of 200 nm or less from the fibrous conductor, and the mode diameter M2 of the pores in the second region at a distance of more than 200 nm from the fibrous conductor satisfy M1<M2. In other words, the catalyst layer is formed such that large pores are more present in the second region than in the first region. By this configuration, since gas diffusion pathways can be formed in the second region, gas can be allowed to diffuse efficiently throughout the catalyst layer, and high gas diffusion performance can be secured. As a natural result, in a vicinity of the fibrous conductor, the presence probability of the catalyst particles, the particulate conductor, and the proton-conductive resin increases. Protons can be smoothly transported, along the proton-conductive resin adhering to the fibrous conductor and the particulate conductor, to near the catalyst particles. In this way, gas diffusion performance and proton transport performance can be improved, and thereby the oxidation or reduction reaction in the catalyst layer can be allowed to proceed efficiently.

The pore diameter in the catalyst layer can be determined by, for example, thresholding a region having a predetermined area (e.g., length 3 μm×width 3 μm) of an electron microscope photograph of a cross section of the catalyst layer, to distinguish pores (voids) from a region other than pores, and measuring the size of the pores. The diameter of a circle (equivalent circle) having the same area as each pore in the cross-section photograph is referred to as the pore diameter (size of the pore). The mode diameter M1 of the pores in the first region can be determined from the pore diameters measured in the first region at a distance of 200 nm or less from the fibrous conductor, on the region having the predetermined area of the cross-section photograph. The mode diameter M2 of the pores in the second region can also be determined similarly to in the case of the first region, except for measuring the size of the pores in the second region at a distance of more than 200 nm from the fibrous conductor.

Here, the first region means, with a focus on each fibrous conductor, a space having a cylindrical shape (or a shape similar thereto) formed by connecting points at a distance of 200 nm from the surface of the fibrous conductor. To put it differently, it is a space formed by superimposing circles (or shapes similar thereto), the center of each circle being at the center of the cross section perpendicular to the longitudinal direction of the fibrous conductor, the diameter of each circle being equal to the length adding 200 nm to a half of the fiber diameter of the fibrous conductor.

The configuration of the MEA will be more specifically described below.

(Catalyst Layer)

The catalyst layer contains a fibrous electric conductor, catalyst particles, a particulate electric conductor, and a proton-conductive resin. Pores are present in the catalyst layer, and the mode diameter of the pores in a region other than near the fibrous conductor is larger than near the fibrous conductor. In the second region other than the first region located near the fibrous conductor (at a distance of 200 nm or less from the fibrous conductor), comparatively large pores are formed, as compared to in the first region. On the other hand, in the first region, as a natural result, the catalyst particles, the particulate conductor, and the proton-conductive resin are abundantly distributed. Accordingly, gas can diffuse effectively in the catalyst layer through the second region, and catalytic reaction can be allowed to proceed efficiently through the first region.

A ratio of the mode diameter M1 of the pores in the first region to the mode diameter M2 of the pores in the second region other than the first region (=M1/M2) is, for example, 0.90 or less, preferably 0.8 or less, and may be 0.6 or less. The lower limit of M1/M2 is, for example, 0.03 or more. When M1/M2 is within such a range, gas diffusion performance and proton transport performance in the catalyst layer can be further enhanced.

The mode diameter M2 of the pores in the second region is, for example, preferably 50 nm or more and 1000 nm or less, more preferably 60 nm or more and 400 nm or less.

When M2 is within such a range, it is possible to easily secure water removal performance and high gas diffusion performance, as well as to easily distribute the catalyst particles, the particulate conductor, and the proton-conductive resin, in a vicinity of the fibrous conductor.

In the catalyst later, the fibrous conductor content may be the same or different between a region A on the electrolyte membrane side and a region B on the gas diffusion layer side. In view of further enhancing gas diffusion performance, a content Ca of the fibrous conductor in the region A and a content Cb of the fibrous conductor in the region B preferably satisfy Ca<Cb. The contents Ca and Cb herein mean a ratio of the volume (volume %) of the fibrous conductor to the total volume of the particulate and fibrous conductors in each region.

The content of each conductor can be determined from, for example, a scanning electron microscope (abbreviated as SEM) photograph of a cross section of the catalyst layer. Specifically, the cross-section photograph is subjected to image processing (thresholding) so that voids and conductors can be distinguished from each other. Then, in an arbitrary region having a predetermined area on the image, the conductors are distinguished into fibrous and particulate conductors, to calculate an area of each conductor. The ratio (%) of the area of the fibrous conductor to the total area of the fibrous and particulate conductors is determined. The area percentage thus determined, taken as corresponding to the above volume percentage, can be referred to as the content of the conductor. The area percentage may be an average of values determined with respect to a plurality of regions each having a predetermined area, in the region A or B on the cross-section photograph.

The catalyst layer satisfying Ca<Cb can be obtained by, for example, using two liquid dispersions for catalyst layer differing in the fibrous conductor content, and on the electrolyte membrane, forming a layer to be the region A and then a layer to be the region B.

Given that the thickness of the catalyst layer is denoted by T, the region A is a region within 0.5T from the interface with the electrolyte membrane of the catalyst layer, and the region B is a remaining region on the gas diffusion layer side.

A ratio of the content Ca to the content Cb Ca/Cb) is, for example, preferably 0.95 or less, more preferably 0.9 or less, or 0.8 or less. The lower limit of Ca/Cb is not particularly limited, and is, for example, 0.1 or more. When Ca/Cb is within such a range, gas diffusion performance and proton conducting performance can be easily further enhanced.

The content Ca is, for example, 4% by volume or more and 40% by volume or less, preferably 8% by volume or more and 30% by volume or less. When the content Ca is within such a range, higher gas diffusion performance can be secured. Also, high proton-conducting performance is likely to be obtained.

Between the region A and the region B, the mass ratio of the proton-conductive resin to the particulate conductor may be the same or different. In view of increasing the proton transport paths in the region A on the electrolyte membrane side, thereby to further enhance proton transport performance, a mass ratio Ra of the proton-conductive resin to the particulate conductor in the region A and a mass ratio Rb of the proton-conductive resin to the particulate conductor in the region B preferably satisfy Ra>Rb.

The catalyst layer satisfying Ra>Rb can be obtained by, for example, using two liquid dispersions for catalyst layer differing in the mass ratio of the proton-conductive resin to the particulate conductor, and forming two layers. Another possible way is, when drying an applied film of a liquid dispersion for catalyst layer, to dry the applied film such that it slowly dries on the electrolyte membrane side as compared to on the gas diffusion layer side by, for example, providing hot air from the catalyst layer surface side, so that the proton-conductive resin migrates to the electrolyte membrane side.

The ratio of Rb to Ra (=Rb/Ra) is, for example, 0.95 or less, preferably 0.85 or less, more preferably 0.75 or less. The lower limit of Rb/Ra is not particularly limited, and is, for example, preferably 0.3 or more. When Rb/Ra is within such a range, improvement effect of proton transport performance can be further enhanced, while securing high gas diffusion performance.

The mass ratio Ra is, for example, 0.5 or more and 2.0 or less, preferably 0.6 or more and 1.8 or less, more preferably 0.8 or more and 1.5 or less. When Ra is within such a range, high proton transport performance can be secured in the region A, and the catalytic reaction can be allowed to proceed more efficiently.

The catalyst layer in which the fibrous conductor content and/or the mass ratio of the proton-conductive resin to the particulate conductor differs between the region A and the region B can be formed by using, for example, liquid dispersions for catalyst layer differing in the fibrous conductor content and/or the mass ratio of the proton-conductive resin to the particulate conductor.

In view of allowing the cell reaction to proceed efficiently, in the catalyst layer, the catalyst particles are preferably supported at least on the particulate conductor. The catalyst particles may be supported on both the fibrous conductor and the particulate conductor. The second region where gas diffusion pathways are formed tends to be located in a vicinity of the particulate conductor, rather than in a vicinity of the fibrous conductor. Therefore, in view of allowing the catalytic reaction to proceed efficiently at positions close to the gas diffusion pathways, a support rate Sp of the catalyst particles on the particulate conductor, and a support rate Sf of the catalyst particles on the fibrous conductor preferably satisfy Sp>Sf.

The catalyst layer satisfying Sp>Sf can be obtained by, for example, in forming a catalyst layer, using a fibrous conductor and a particulate conductor supporting a larger amount of catalyst particles than the fibrous conductor. Here, a fibrous conductor without supporting catalyst particles may be used.

A ratio of the support rate Sf of the catalyst particles on the fibrous conductor to the support rate Sp of the catalyst particles on the particulate conductor (=Sf/Sp) is, for example, preferably 0.8 or less, preferably 0.6 or less, more preferably 0.4 or less. Sf/Sp is preferably equal to or more than 0. When Sf/Sp is within such a range, the catalytic reaction can be allowed to proceed more efficiently.

The support rates Sf and Sp herein means a ratio of the volume of the catalyst particles to the total volume of each conductor and the catalyst particles supported thereon. The support rates Sf and Sp can be determined from a transmitting electron microscope (abbreviated as IBM) image of a cross section of the catalyst layer. For example, part of the cross section of the catalyst layer is cut out and subjected to TEM, to obtain an image thereof. On the TEM image, a plurality of (e.g. five or more) fibrous conductors supporting catalyst particles are selected at random. With respect to each fibrous conductor, the area of the fibrous conductor, and the area of all the catalyst particles supported on the fibrous conductor are determined. Then, the ratio of the area of the supported catalyst particles (the total area of all the supported catalyst particles) to a total of the areas of the fibrous conductor and all the catalyst particles supported on the fibrous conductor is calculated. The values thus obtained are averaged. The average of the area percentages, taken as corresponding to the above volume percentage, can be referred to as the support rate Sf. Likewise, as for the particulate conductor supporting catalyst particles, the support rate Sp can be determined in a similar manner. The support rates Sf and Sp may be each an average of values determined with respect to a plurality of (e.g. five or more) arbitrary regions each having a predetermined area in the catalyst layer.

In the catalyst layer, the fibrous conductor may include a standing fibrous electric conductor (hereinafter sometimes simply referred to as "standing fiber") oriented along the thickness direction of the catalyst layer, or a lying fibrous electric conductor (hereinafter sometimes simply referred to as "lying fiber") oriented along the plane direction of the catalyst layer. In a preferred embodiment, the fibrous conductor includes the standing fiber. In this case, the pores in the second region can readily communicate with each other along the thickness direction, and gas diffusion pathways can be readily secured. Therefore, gas diffusion performance in the catalyst layer can be further enhanced.

Here, the fibrous conductor being oriented along the thickness direction of the catalyst layer means that the fibrous conductor is oriented at an orientation angle θ of 45° or more and 90° or less, with respect to a principal surface (first principal surface) of the catalyst layer on the gas diffusion layer side. The fibrous conductor being oriented along the first principal surface means that the fibrous conductor is oriented at an orientation angle θ of 0° or more and less than 45°, with respect to the first principal surface. When the first principal surface has irregularities, a plane perpendicular to the thickness direction of the catalyst layer, or the interface between the electrolyte membrane and the catalyst layer (the principal surface of the catalyst layer on the electrolyte membrane side (second principal surface)) can be used as a reference plane in determining the orientation angle θ (the same applies hereinafter).

Figure 3:
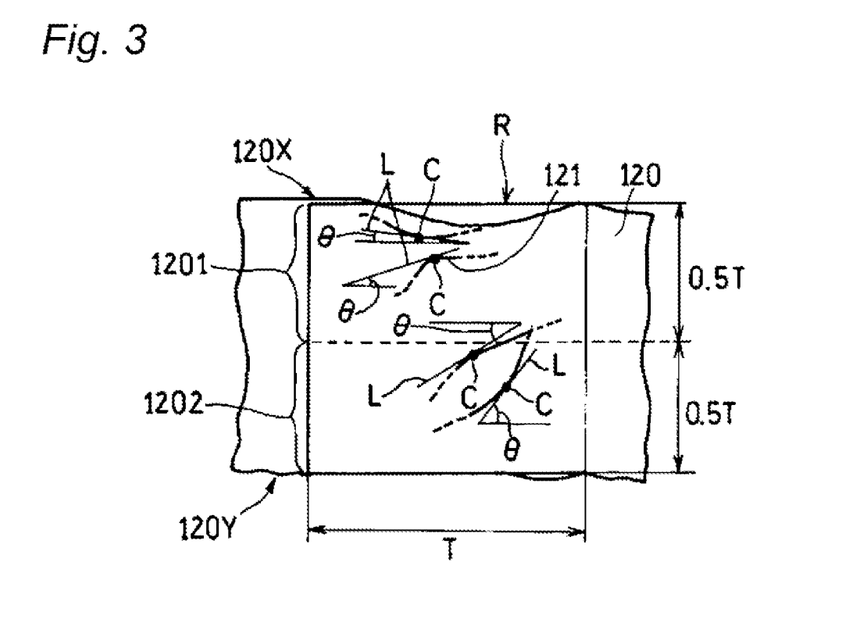
FIG. 3 A schematic view for explaining a method of calculating an orientation angle θ of a fibrous electric conductor, in a cross section along the thickness direction of the catalyst layer.

The orientation angle θ of the fibrous conductor can be determined as below with reference to FIG. 3. FIG. 3 is a schematic view for explaining a method of calculating the orientation angle θ of the fibrous conductor, in a cross section along the thickness direction of the catalyst layer. FIG. 3 shows some of the fibrous conductors only.

First, a cross-section along the thickness direction of a catalyst layer 120 is photographed under a scanning electron microscope. On the obtained SEM image, a square region with the side length equal to a thickness T of the catalyst layer 120, the region within which a plurality of (e.g., 20 or more) fibrous conductors 121 can be identified (hereinafter, designated region R), is defined. The designated region R can be defined as follows. First, a straight line along the thickness direction of the catalyst layer 120 is drawn. A point of intersection of the straight line and a second principal surface 120Y is taken as one of the vertexes of the square to be defined as the designated region R.

Next, with respect to all the fibrous conductors 121 that can be identified within the designated region R, a tangent line L is drawn at midpoint C of its length within R. An angle formed between the tangent line L and the first principal surface 120X (only 90° or less) is referred to as the orientation angle θ of the fibrous conductor 121. In FIG. 3, the orientation angle θ is determined, with a plane perpendicular to the thickness direction of the catalyst layer 120 used as a reference plane.

When the orientation angle θ thus obtained is 0° or more and less than 45°, the fibrous conductor 121 is regarded as the lying fiber. When the orientation angle θ is 45° or more and 90° or less, the fibrous conductor 121 is regarded as the standing fiber. With respect to all the fibrous conductors 121 that can be identified within the designated region R, the tangent line L is drawn similarly, to determine the orientation angle θ of each conductor. The fibrous conductor 121 may be specified by, for example, subjecting the SEM image to thresholding.

Given that the thickness of the catalyst layer 120 is denoted by T, the catalyst layer 120 has a region A 1202 having a thickness up to 0.5T from the principal surface (second principal surface) on the electrolyte membrane side of the catalyst layer 120, and a remaining region B 1201 on the gas diffusion layer side (on the first principal surface 120X side).

In the catalyst layer, the number of the standing fibers in the region A on the electrolyte membrane side is preferably smaller than that in the region B on the gas diffusion layer side. The presence of many standing fibers in the region B can improve the gas diffusion performance in the perpendicular direction in a vicinity of the gas diffusion layer, allowing gas to easily diffuse throughout the catalyst layer.

In the present embodiment, it is required that at least one of the pair of catalyst layers (the catalyst layer on the anode side and the catalyst layer on the cathode side) is configured as described above. When only one of the catalyst layers has the configuration as described above, the other catalyst layer may have a publicly known configuration. For example, the other catalyst layer includes a proton conductive resin and catalyst particles, and depending on the situation, may include a particulate or fibrous conductor that supports catalyst particles. On the anode side of a fuel cell, hydrogen gas is supplied; on the cathode side, oxygen gas is supplied. Oxygen gas, however, is difficult to diffuse, as compared to hydrogen gas. Therefore, it is particularly preferable that at least the catalyst layer on the cathode side is configured as described above.

(Fibrous Conductor)

The fibrous conductor may be, for example, a metal fiber, or a fibrous carbon material. Examples of the fibrous carbon material include, for example, vapor growth carbon fibers (abbreviated as VGCF), carbon nanotubes, and carbon nanofibers. The fibrous conductor may be of any length. In view of allowing more standing fibers to be disposed, the average fiber length of the fibrous conductor is preferably 0.15 μm or more and 5 μm or less, more preferably 0.2 μm or more and 2 μm or less. The fibrous conductor may be of any diameter. In view of securing gas pathways, the average diameter of the fibrous conductor is preferably 5 nm or more and 200 nm or less, more preferably 10 nm or more and 150 nm or less.

The average fiber length and average diameter of the fibrous conductor can be determined by, on a cross-section SEM or IBM image of the catalyst layer, measuring the fiber length and the diameter of a plurality of (e.g. 30) randomly selected fibrous conductors, and averaging the measured lengths and diameters, respectively.

In the MEA, some of the fibrous conductors may be present across between the catalyst layer and the gas diffusion layer, without confined within the catalyst layer. This improves the adhesion between the catalyst layer and the gas diffusion layer, leading to reduced interface separation.

(Catalyst Particles)

The catalyst particles are not particularly limited, and may be a catalyst metal, such as an alloy or simple substance selected from Sc, Y, Ti, Zr, V, Nb, Fe, Co, Ni, Ru, Rh, Pd, Pt, Os, Ir, lanthanoid series elements, and actinoid series elements. Examples of the catalyst particles used for the anode include a Pt—Ru alloy. Examples of the catalyst metal used for the cathode include Pt and a Pt—Co alloy. At least some of the catalyst particles are preferably supported on the particulate conductors. The catalyst particles are preferably supported on the fibrous conductors, as well as on the particulate conductors. This allows the catalyst particles to easily come into contact with the gas, thus increasing the efficiency of the oxidation reaction or reduction reaction of the gas.

The catalyst particles have an average particle diameter of, for example, 1 nm or more and 10 nm and less, preferably 1.5 nm or more and 6 nm or less. The average particle diameter of the catalyst particles can be determined by, for example, direct observation on the particles under a transmission electron microscope (TEM), crystallite diameter distribution measurement by X-ray diffraction (abbreviated as XRD), or particle size distribution measurement by small axis X-ray scattering (abbreviated as SAXS).

(Particulate Conductor)

The particulate conductor is not particularly limited, and may be, for example, metal particles or electrically conductive metal compound particles. Preferably, the particulate conductor is a particulate carbon material. Among particulate carbon materials, carbon black is preferable in terms of its excellent electrical conductivity. Examples of the carbon black include acetylene black, Ketjen black, thermal black, furnace black, and channel black. The particle size thereof (or the length of a structure composed of connected primary particles) may be any value conventionally used for the catalyst layer of fuel cells.

The particulate conductor has a specific surface area of preferably 800 $m^2/g$ or more, more preferably 1000 $m^2/g$ or more. When the specific surface area is such a value, the particulate conductor tends to support many catalyst particles, which can lead to improved catalytic activity.

The particulate conductor has an average primary particle diameter of, for example, 0.01 μm or more and 1 μm or less, preferably 0.02 μm or more and 0.1 μm or less. The average primary particle diameter of the particulate conductor can be measured from a cross-section SEM or TEM image of the catalyst layer.

(Proton-Conductive Resin)

The proton-conductive resin is not particularly limited, and examples thereof include perfluorocarbon sulfonic acid-series polymers and hydrocarbon-based polymers. Among them, perfluorocarbon sulfonic acid-series polymers are preferable in terms of their excellent heat resistance and chemical stability. An example thereof is Nafion (registered trademark).

In the catalyst layer, the fibrous conductor is contained preferably in an amount of 2 parts by mass or more and 30 parts by mass or less, more preferably 4 parts by mass or more and 15 parts by mass or less, per 100 parts by mass of the total of the catalyst particles, the particulate conductor, and the proton-conductive resin. When the amount of the fibrous conductor is within such a range, the catalyst particles, the particulate conductor, and the proton-conductive resin are likely to be present near the fibrous conductor, and gas diffusion pathways are likely to be formed in the second region. Therefore, gas diffusion performance and electrochemical reaction efficiency are likely to be enhanced.

The thickness of the catalyst layer (thickness T) is preferably small when considering the size reduction of the fuel cell; however, in view of strength, it is preferably not too small. The thickness of the catalyst layer is, for example, 1

µm or more and 50 µm or less. The thickness of the catalyst layer is an average of the distances from one principal surface to the other principal surface measured at 10 arbitrary points. For example, the thickness of the catalyst layer can be obtained by averaging the distances when drawing a straight line from the principal surface on the gas diffusion layer side to the interface with the electrolyte membrane, at 10 arbitrary points on a SEM image of a cross section (100 µm wide) along the thickness direction of the catalyst layer.

Figure 1:
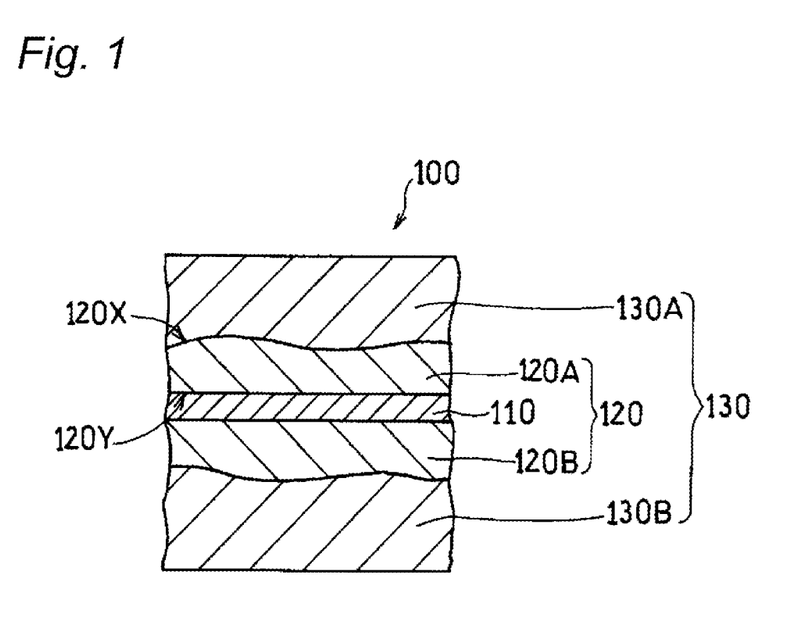
FIG. 1 A vertical cross-sectional view schematically showing a structure of an MEA according to one embodiment of the present disclosure.

FIG. 1 is a vertical cross-sectional view schematically showing a structure of the MEA.

An MEA 100 includes an electrolyte membrane 110, and a pair of catalyst layers 120 disposed so as to sandwich the electrolyte membrane 110, and a pair of gas diffusion layers 130 disposed on the catalyst layers 120 on opposite sides to the electrolyte membrane 110. The pair of catalyst layers 120 each comprise a first catalyst layer 120A and a second catalyst layer 120B. The pair of gas diffusion layers 130 each comprise a first gas diffusion layer 130A and a second gas diffusion layer 130B. The first catalyst layer 120A is sandwiched between the first gas diffusion layer 130A on the first principal surface 120X side and the electrolyte membrane 110 on the second principal surface 120Y side.

Figure 2:
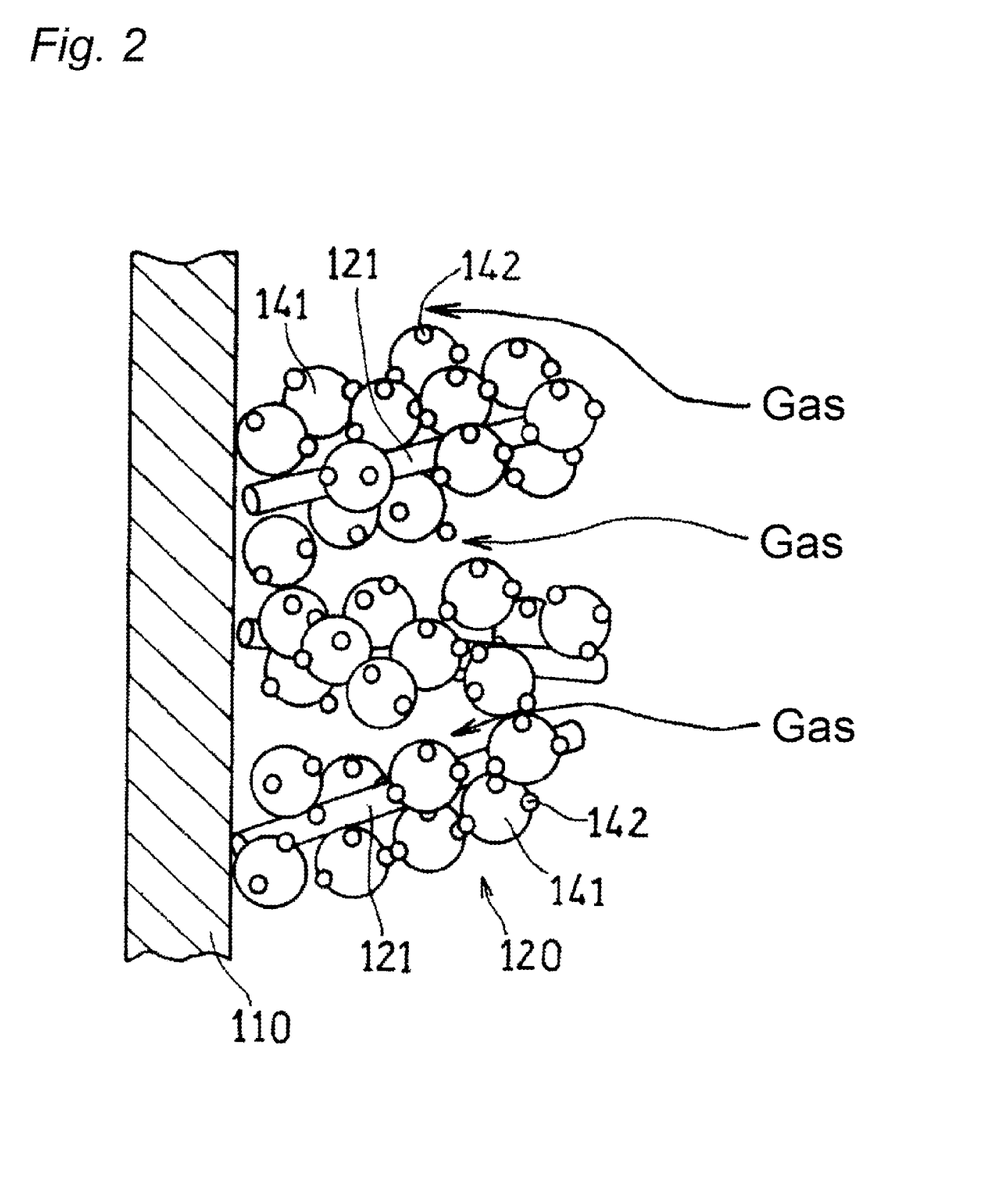
FIG. 2 A cross-sectional view schematically showing a state of a catalyst layer in the MEA.
Figure 5:
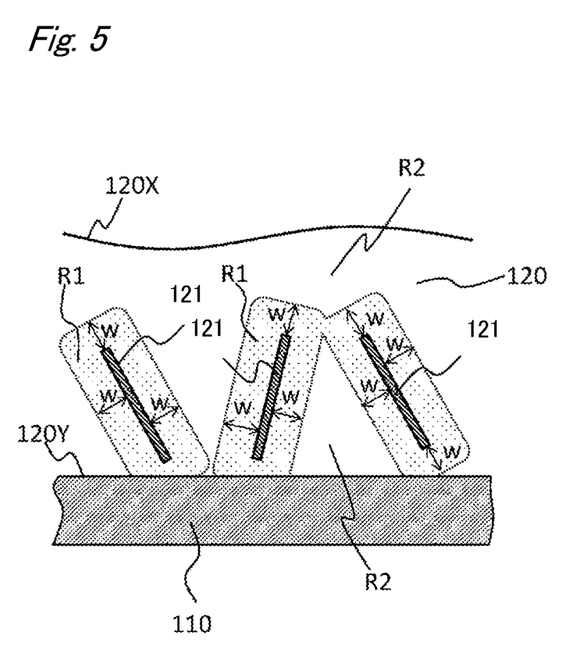
FIG. 5 A cross-sectional view schematically showing a layout of the fibrous conductor in the MEA.

FIG. 2 is a cross-sectional view schematically showing a state of the catalyst layer in the MEA. FIG. 5 is a cross-sectional view schematically showing a layout of fibrous conductors in the MEA. FIG. 5 omits particulate conductors 141 and catalyst particles 142.

As shown in FIG. 5, a first region R1 is a region at a distance of 200 nm or less from a fibrous electric conductor 121, and a second region R2 is a region at a distance of more than 200 nm from the fibrous conductor 121. Note that the first and second regions R1 and R2 are absent within the electrolyte membrane 110. In FIG. 5, the boundary between the first region R1 and the second region R2 is shown by a dotted line. The reference numeral W indicates a distance from the fibrous conductor 121.

FIG. 2 illustrates a state of the catalyst layer 120 near the interface between the electrolyte membrane 110 and the catalyst layer 120. The catalyst layer 120 includes the fibrous conductors 121, the particulate conductors 141, the catalyst particles 142, and a proton-conductive resin (not shown). In the catalyst layer 120, in a vicinity of the fibrous conductor 121 (first region), the particulate conductors 141, the catalyst particles 142, and the unillustrated proton-conductive resin are present. Therefore, the pores in the vicinity of the fibrous conductor 121 are small in diameter. On the other hand, in a location away from the fibrous conductor 121 (second region), the presence probability of the particulate conductors 141, the catalyst particles 142, and the unillustrated proton-conductive resin is low, resulting in the presence of comparatively large pores. Due to the presence of these comparatively large pores, gas diffusion pathways are formed in the catalyst layer 120, and high gas diffusion performance can be obtained. Furthermore, the proton-conductive resin adhering to the fibrous conductors 121 facilitates smooth transport of protons along the fibrous conductors 121. Many of the catalyst particles 142 are supported on the particulate conductors 141. This allows the catalytic reaction to proceed efficiently utilizing the gas diffused from the gas diffusion pathways and the protons transported along the fibrous conductors 121.

(Electrolyte Membrane)

The electrolyte membrane is formed of, for example, a solid polymer material, such as a fluorine-containing polymer or a non-fluorine polymer. Examples of the fluorine-containing polymer that can be used as a material of the electrolyte membrane include sulfonic acid-type perfluorocarbon polymers, and perfluorocarbon polymers having a phosphonic acid group and/or a carboxy group. Examples of the sulfonic acid-type perfluorocarbon polymers include Nafion (manufactured by DuPont: registered trademark). Examples of the non-fluorine polymer include polysulfone resins. The electrolyte membrane has a thickness of, for example, 3 µm or more and 100 or less.

(Gas Diffusion Layer)

The gas diffusion layer may be an electrically conductive porous substrate. The conductive porous substrate is preferably formed of a carbonaceous material, such as carbon black, graphite, or carbon fiber. Specific examples thereof include carbon paper, carbon cloth, and a porous conductive carbon sheet obtained by forming a composition including a carbon material and a binder, into a sheet.

The MEA is produced, for example, as follows.

First, an electrolyte membrane and a pair of gas diffusion layers are prepared. Separately, catalyst particles and a particulate conductor are mixed in a dispersion medium (e.g., water, ethanol, propanol), to give a dispersion. To the resultant dispersion under stirring, a proton-conductive resin and a fibrous conductor are added one after another, to give a catalyst dispersion. The proton-conductive resin may be dividedly added in plural times. In this case, the second or later addition of the proton-conductive resin may be done together with the fibrous electric conductor.

Subsequently, the obtained catalyst dispersion is applied onto the electrolyte membrane to form a catalyst layer on both sides, followed by laminating a gas diffusion layer on the principal surface of each catalyst layer, to form an MEA. Alternatively, the catalyst dispersion is applied in a uniform thickness onto appropriate two transfer base sheets, to form two catalyst layers. The obtained two catalyst layers are transferred respectively onto the principal surfaces of the electrolyte membrane, followed by laminating a gas diffusion layer on the principal surface of each catalyst layer, to form an MEA. When an applied film of the catalyst dispersion on the surface of the transfer base sheet is dried, convection occurs in the dispersion medium, making at least some of the fibrous conductors stand up and serve as the standing fibers.

The pore diameter can be made larger in the second region than that in the first region near the fibrous conductor, by forming a composite material of fibrous conductors and particulate conductors adhering to the fibrous conductors, and forming a catalyst layer from a catalyst dispersion prepared using the composite material. Another possible way of making the pore diameter larger in the second region than in the first region is to add a pore-forming material when preparing a catalyst dispersion, and remove the pore-forming material when completing or after completing the catalyst layer. Still another possible way of making the pore diameter larger in the second region than in the first region is to adjust the temperature and/or duration when drying an applied film of the catalyst dispersion.

The catalyst dispersion can be applied by any conventional method, for example, spraying, screen printing, and coating methods using various coaters such as a blade coater, a knife coater, and a gravure coater. The transfer base sheet is preferably a sheet having a smooth surface, the sheet made of, for example, polyethylene terephthalate (PET) or polypropylene.

The temperature when drying an applied film of the catalyst dispersion is, for example, preferably 50° C. or more and 90° C. or less, more preferably 60° C. or more and 80° C. or less. The duration when drying an applied film of the catalyst dispersion is, for example, 1 min or more and 10 min or less, preferably 2 min or more and 5 min or less.

In the case of using a pore-forming material, although depending on the type of the pore-forming material, pores can be formed by decomposing or evaporating the pore-forming material, concurrently with drying an applied film of the catalyst dispersion. The pore-forming material may be decomposed or evaporated after drying the applied film. The temperature when decomposing or evaporating the pore-forming material can be selected according to the types of the pore-forming material and the proton-conductive resin, and is, for example, preferably 50° C. or more and 200° C. or less, more preferably 60° C. or more and 140° C. or less. The duration when decomposing or evaporating the pore-forming material is, for example, 1 min or more and 10 min or less.

The pore-forming material may be any known one. Examples of the pore-forming material include water-soluble short fibers, metal carbonates, metal oxalates, alumina whiskers, and silica whiskers. Further examples of the pore-forming material include dicarboxylic acids, such as fumaric acid, malonic acid, and malic acid, and liquid materials having no solubility for the proton-conductive resin.

(Fuel Cell)

A fuel cell according to the present embodiment includes the above-described MEA, and a pair of separators disposed so as to sandwich the MEA, with each of the pair of gas diffusion layers in the MEA interposed therebetween.

Figure 4:
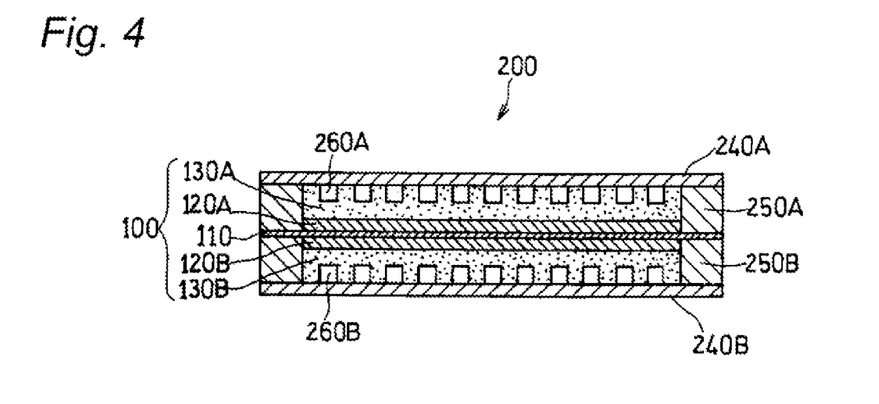
FIG. 4 A cross-sectional view schematically showing a structure of a unit cell included in a fuel cell according to an embodiment of the present disclosure.

An example structure of the fuel cell according to the present embodiment will be described below with reference to FIG. 4. FIG. 4 is a cross-sectional view schematically showing a structure of a unit cell included in the fuel cell according to the present embodiment. Usually, two or more unit cells are stacked and disposed as a cell stack in the fuel cell. FIG. 4 shows one unit cell only, for the sake of convenience.

A unit cell 200 includes: an electrolyte membrane 110; a pair of catalyst layers (first catalyst layer 120A and second catalyst layer 120B) disposed so as to sandwich the electrolyte membrane 110; a pair of gas diffusion layers (first gas diffusion layer 130A and second gas diffusion layer 130B) disposed so as to sandwich the electrolyte membrane 110, with the first catalyst layer 120A and the second catalyst layer 120B respectively interposed therebetween; and a pair of separators (first separator 240A and second separator 240B) disposed so as to sandwich the electrolyte membrane 110, with the first gas diffusion layer 130A and the second gas diffusion layer 130B respectively interposed therebetween. Of a pair of electrode layers each comprising the catalyst layer and the gas diffusion layer, one of the electrode layers functions as an anode, and the other electrode layer functions as a cathode. The electrolyte membrane 110 is slightly larger than the first and the catalyst layer 120A and 120B, and the peripheral edge portion of the electrolyte membrane 110 extends beyond the first and the second catalyst layer 120A and 120B. The peripheral edge portion of the electrolyte membrane 110 is held between a pair of seal members 250A and 250B.

With respect to the electrolyte membrane, the catalyst layer, and the gas diffusion layer, reference can be made to the description of the MEA. Description will be given below with respect to other components.

(Separator)

The first separator 240A and the second separator 240B are required to have airtightness, electron conductivity, and electrochemical stability, and may be made of any material. Preferable examples of such materials include carbon materials, and metal materials. The metal material may be coated with carbon. For example, a metal sheet is cut by punching in a predetermined shape, and applying surface treatment thereto, to give the first separator 240A and the second separator 240B.

In the present embodiment, the first gas diffusion layer 130A is provided with a gas flow channel 260A, on a surface abutting the first separator 240A. The second gas diffusion layer 130B is provided with a gas flow channel 260B, on a surface abutting the second separator 240B. It is therefore unnecessary to form a gas flow channel on the first separator 240A and the second separator 240B. The gas flow channel may be of any shape, and can be formed in a shape of, for example, parallel channel, or serpentine channel. When the first gas diffusion layer 130A or the second gas diffusion layer 130B does not have the gas flow channel 260A or 260B, a gas flow channel is formed on a surface of the corresponding separator, the surface facing the gas diffusion layer.

(Seal Member)

The seal members 250A and 250B are a material having elasticity, and prevent leakage of fuel and/or oxidant from the gas flow channels 260A and 260B. For example, the seal members 250A and 250B each have a frame-like shape continuously surrounding the peripheral edge portion of the first and the second catalyst layer 120A and 120B. Any known material and any known configuration can be employed for the seal members 250A and 250B.

EXAMPLES

The present invention will be specifically described below by way of Example and Comparative Example. It should be noted, however, that the present invention is not limited to the following Example.

Example 1

<Production of MEA>

A particulate conductor (acetylene black, BET specific surface area: 830 $m^2/g$) with catalyst particles (Pt—Co alloy) supported thereon was added to a proper amount of water, and dispersed by stirring. After a proper amount of ethanol was added to the resultant dispersion under stirring, 100 parts by mass of a proton-conductive resin (Nafion (registered trademark)) was added, per 100 parts by mass of the above particulate carbon conductor with 30 parts by mass of catalyst particles supported thereon. Subsequently, 20 parts by mass of a fibrous carbon material (average diameter 150 nm, average fiber length 2 μm), and 5 parts by mass of a pore-forming material (zirconium carbonate) were further added and stirred, to prepare a catalyst dispersion for cathode catalyst layer. Separately, a catalyst dispersion for anode catalyst layer was prepared in a similar manner to the catalyst dispersion for cathode catalyst layer, except that the fibrous carbon material and the pore-forming material were not blended.

Next, a 50-μm-thick Nafion membrane was prepared as an electrolyte membrane, and two porous electrically-conductive carbon sheets each provided with a microporous layer (MPL) on one of its principal surfaces were prepared as gas diffusion layers. First, on the cathode-side principal surface of the electrolyte membrane, the catalyst dispersion for cathode catalyst layer was applied by spraying, and left to stand in a 110° C. atmosphere for 10 min to dry, and concurrently, the zirconium carbonate serving as the pore-forming material was decomposed.

Next, on the anode-side principal surface of the electrolyte membrane, the catalyst dispersion for anode catalyst layer was applied by spraying. The electrolyte membrane with the dispersion applied thereto was left to stand in a 70° C. atmosphere for 3 min to dry.

Next, a frame-shaped seal member was disposed so as to surround each of the anode and the cathode. Next, a gas diffusion layer was placed on the principle surface of the anode catalyst layer on the opposite side to the electrolyte membrane (such that the microporous layer faces the anode catalyst layer), and a gas diffusion layer was placed on the principal surface of the cathode catalyst layer on the opposite side to the electrolyte membrane (such that the microporous layer faces the cathode catalyst layer). Then, a heat press is applied to integrate the electrolyte membrane, the catalyst layers, and the gas diffusion layers together, to produce a membrane electrode assembly. A cross section of the membrane electrode assembly thus obtained was photographed under a scanning electron microscope. M1/M2 determined from the SEM image in the manner as descried above was 0.4. The SEM image showed that some of the catalyst particles were supported on the fibrous carbon material, and Sf/Sp was 0.3.

<Production of Unit Cell>

The membrane electrode assembly was held between a pair of stainless steel flat plates (separators), to complete a unit cell A for experiment.

Comparative Example 1

Catalyst layers and a unit cell B1 were produced in a similar manner to Example 1, except that the pore-forming material was not used.

<Evaluation>

The unit cells produced in Example and Comparative Example were used to measure I-V characteristics under the conditions of cell temperature 80° C., gas utilization rate 50%, and relative humidity 100%. As a result, Example showed about 1% to 4% improvement in the maximum output power density, as compared to Comparative Example.

INDUSTRIAL APPLICABILITY

The fuel cell according to the present disclosure can be suitably used as a stationary power supply for household cogeneration system, and a vehicle power supply. The present invention can be suitably applied to a polymer electrolyte fuel cell, but is not limited thereto, and can be applied to fuel cells in general.

REFERENCE SIGNS LIST

100 Membrane electrode assembly
110 Electrolyte membrane
120 Catalyst layer
120A First catalyst layer
120B Second catalyst layer
120X First principal surface
120Y Second principal surface
1201 Region B
1202 Region A
121 Fibrous conductor
141 Particulate conductor
142 Catalyst particle
130 Gas diffusion layer
130A First gas diffusion layer
130B Second gas diffusion layer
200 Fuel cell (Unit cell)
240A First separator
240B Second separator
250A, 250B Seal member
260A, 260B Gas flow channel

The invention claimed is:

1. A membrane electrode assembly comprising
an electrolyte membrane, and a pair of electrode layers disposed so as to sandwich the electrolyte membrane, wherein:
the pair of electrode layers include a pair of catalyst layers disposed so as to sandwich the electrolyte membrane, and a pair of gas diffusion layers disposed on the pair of catalyst layers on respective opposite sides to the electrolyte membrane,
at least one catalyst layer of the pair of catalyst layers contains a fibrous electric conductor, catalyst particles, a particulate electric conductor, and a proton-conductive resin,
the at least one catalyst layer has a first region at a distance of 200 nm or less from the fibrous electric conductor, and a second region at a distance of more than 200 nm from the fibrous electric conductor,
pores are present in the first region and the second region,
a mode diameter M1 of the pores in the first region and a mode diameter M2 of the pores in the second region satisfy M1<M2,
the ratio M1/M2 is 0.03 or more and 0.90 or less,
an average fiber length of the fibrous conductor is 0.15 μm or more and 5 μm or less,
in the at least one catalyst layer, the fibrous electric conductor includes a standing fibrous electric conductor oriented along a thickness direction of the catalyst layer, and
the at least one catalyst layer has a region A on the electrolyte membrane side and a region B on the gas diffusion layer side, and
a content Ca of the fibrous electric conductor in the region A and a content Cb of the fibrous electric conductor in the region B satisfy Ca<Cb.

2. The membrane electrode assembly of claim 1, wherein a mass ratio Ra of the proton-conductive resin to the particulate electric conductor in the region A and a mass ratio Rb of the proton-conductive resin to the particulate electric conductor in the region B satisfy Ra>Rb.

3. The membrane electrode assembly of claim 1, wherein the particulate electric conductor has a specific surface area of 800 m$^2$/g or more.

4. The membrane electrode assembly of claim 1, wherein the catalyst particles are supported on the fibrous electric conductor and the particulate electric conductor, and
a support rate Sp of the catalyst particles on the particulate electric conductor, and a support rate Sf of the catalyst particles on the fibrous electric conductor satisfy Sp>Sf.

5. The membrane electrode assembly of claim 1, wherein the pair of the catalyst layers are a catalyst layer on a cathode side and a catalyst layer on an anode side, and
at least the catalyst layer on the cathode side has the first region and the second region.

6. A fuel cell comprising
the membrane electrode assembly of claim 1, and
a pair of separators disposed so as to sandwich the membrane electrode assembly, with each of the pair of the gas diffusion layers interposed between the membrane electrode assembly and each of the pair of the separators.

7. The membrane electrode assembly of claim 1, wherein the ratio M1/M2 is 0.03 or more and 0.6 or less.

8. The membrane electrode assembly of claim 1, wherein the mode diameter M2 is 50 nm or more and 1000 nm or less.

9. The membrane electrode assembly of claim 4, wherein a ratio of the support rate Sf to the support rate Sp (=Sf/Sp) is 0.8 or less.

10. A membrane electrode assembly comprising
an electrolyte membrane, and a pair of electrode layers disposed so as to sandwich the electrolyte membrane, wherein:
the pair of electrode layers include a pair of catalyst layers disposed so as to sandwich the electrolyte membrane, and a pair of gas diffusion layers disposed on the pair of catalyst layers on respective opposite sides to the electrolyte membrane,
at least one catalyst layer of the pair of catalyst layers contains a fibrous electric conductor, catalyst particles, a particulate electric conductor, and a proton-conductive resin,
the at least one catalyst layer has a first region at a distance of 200 nm or less from the fibrous electric conductor, and a second region at a distance of more than 200 nm from the fibrous electric conductor,
pores are present in the first region and the second region,
a mode diameter M1 of the pores in the first region and a mode diameter M2 of the pores in the second region satisfy M1<M2,
the ratio M1/M2 is 0.03 or more and 0.90 or less,
an average fiber length of the fibrous conductor is 0.15 µm or more and 5 µm or less,
in the at least one catalyst layer, the fibrous electric conductor includes a standing fibrous electric conductor oriented along a thickness direction of the catalyst layer,
the at least one catalyst layer has a region A on the electrolyte membrane side and a region B on the gas diffusion layer side, and
a number of the standing fibers in the region A is smaller than a number of the standing fibers in the region B.

11. The membrane electrode assembly of claim 1, wherein the mode diameter M1 and the mode diameter M2 satisfy M1<M2 at least a region of 3 µm long and 3 µm wide in an electron microscope photograph of a cross section of the catalyst layer.

12. A membrane electrode assembly comprising
an electrolyte membrane, and a pair of electrode layers disposed so as to sandwich the electrolyte membrane, wherein:
the pair of electrode layers include a pair of catalyst layers disposed so as to sandwich the electrolyte membrane, and a pair of gas diffusion layers disposed on the pair of catalyst layers on respective opposite sides to the electrolyte membrane,
at least one catalyst layer of the pair of catalyst layers contains a fibrous electric conductor, catalyst particles, a particulate electric conductor, and a proton-conductive resin,
the at least one catalyst layer has a first region at a distance of 200 nm or less from the fibrous electric conductor, and a second region at a distance of more than 200 nm from the fibrous electric conductor,
pores are present in the first region and the second region,
a mode diameter M1 of the pores in the first region and a mode diameter M2 of the pores in the second region satisfy M1<M2,
the mode diameter M2 is 50 nm or more and 1000 nm or less,
an average fiber length of the fibrous conductor is 0.15 µm or more and 5 µm or less,
in the at least one catalyst layer, the fibrous electric conductor includes a standing fibrous electric conductor oriented along a thickness direction of the catalyst layer,
the at least one catalyst layer has a region A on the electrolyte membrane side and a region B on the gas diffusion layer side, and
a content Ca of the fibrous electric conductor in the region A and a content Cb of the fibrous electric conductor in the region B satisfy Ca<Cb.

13. The membrane electrode assembly according to claim 1, the fibrous conductor is contained in an amount of 2 parts by mass or more and 30 parts by mass or less in the at least one catalyst layer.

14. A membrane electrode assembly comprising
an electrolyte membrane, and a pair of electrode layers disposed so as to sandwich the electrolyte membrane, wherein:
the pair of electrode layers include a pair of catalyst layers disposed so as to sandwich the electrolyte membrane, and a pair of gas diffusion layers disposed on the pair of catalyst layers on respective opposite sides to the electrolyte membrane,
at least one catalyst layer of the pair of catalyst layers contains a fibrous electric conductor, catalyst particles, a particulate electric conductor, and a proton-conductive resin,
the at least one catalyst layer has a first region at a distance of 200 nm or less from the fibrous electric conductor, and a second region at a distance of more than 200 nm from the fibrous electric conductor,
pores are present in the first region and the second region,
a mode diameter M1 of the pores in the first region and a mode diameter M2 of the pores in the second region satisfy M1<M2,
the mode diameter M2 is 50 nm or more and 1000 nm or less,
an average fiber length of the fibrous conductor is 0.15 µm or more and 5 µm or less,
in the at least one catalyst layer, the fibrous electric conductor includes a standing fibrous electric conductor oriented along a thickness direction of the catalyst layer,
the at least one catalyst layer has a region A on the electrolyte membrane side and a region B on the gas diffusion layer side, and
a number of the standing fibers in the region A is smaller than a number of the standing fibers in the region B.

* * * * *